United States Patent [19]
Blomgren et al.

[11] Patent Number: 5,078,467
[45] Date of Patent: Jan. 7, 1992

[54] OPTICAL FIBER CONNECTOR INCLUDING INTEGRAL DEFORMABLE HOUSING AND SECOND-CLASS LEVERS

[75] Inventors: Jack P. Blomgren, Red Wing; Gordon D. Henson, Lake Elmo, both of Minn.

[73] Assignee: Minnesota Mining and Manufacturing Company, Saint Paul, Minn.

[21] Appl. No.: 651,734

[22] Filed: Feb. 7, 1991

[51] Int. Cl.$^5$ .................................................. G02B 6/38
[52] U.S. Cl. .......................................... 385/56; 385/55; 385/92
[58] Field of Search ............... 350/96.20, 96.21, 96.22, 350/96.10

[56] References Cited

U.S. PATENT DOCUMENTS

| | | | |
|---|---|---|---|
| 4,123,138 | 10/1978 | Morrison | 350/96.21 |
| 4,327,964 | 5/1982 | Haesly et al. | 350/96.21 |
| 4,470,180 | 9/1984 | Blomgren | 350/96.21 |
| 4,729,619 | 3/1988 | Blomgren | 350/96.21 |
| 4,754,876 | 7/1988 | Noon et al. | 350/96.21 |
| 4,781,430 | 11/1988 | Tanaka | 350/96.20 |
| 4,818,055 | 4/1989 | Patterson | 350/96.20 |
| 4,824,197 | 4/1989 | Patterson | 350/96.21 |
| 4,865,412 | 9/1989 | Patterson | 350/96.21 |
| 4,948,224 | 8/1990 | Modrey | 350/96.21 |
| 4,997,255 | 3/1991 | Lukas et al. | 350/96.21 |

*Primary Examiner*—Brian Healy
*Attorney, Agent, or Firm*—Gary L. Griswold; Walter N. Kirn; Stephen W. Buckingham

[57] ABSTRACT

A prior optical fiber connector includes an elongated mandrel of substantially uniformly elliptical cross section that is encompassed by a resiliently deformable housing which, in its relatively undeformed state, can optically interconnect two optical fibers by urging their ends against a straight longitudinal groove in the surface of the mandrel. The interconnection can be made more easily when there is, either integral with or around the housing, an envelope incorporating a pair of second-class levers which, when squeezed together by ones fingers, deform the housing. The extremities of the levers can be formed to permit the connector to be releasably attached to a patch panel or to an optical fiber distribution module.

13 Claims, 1 Drawing Sheet

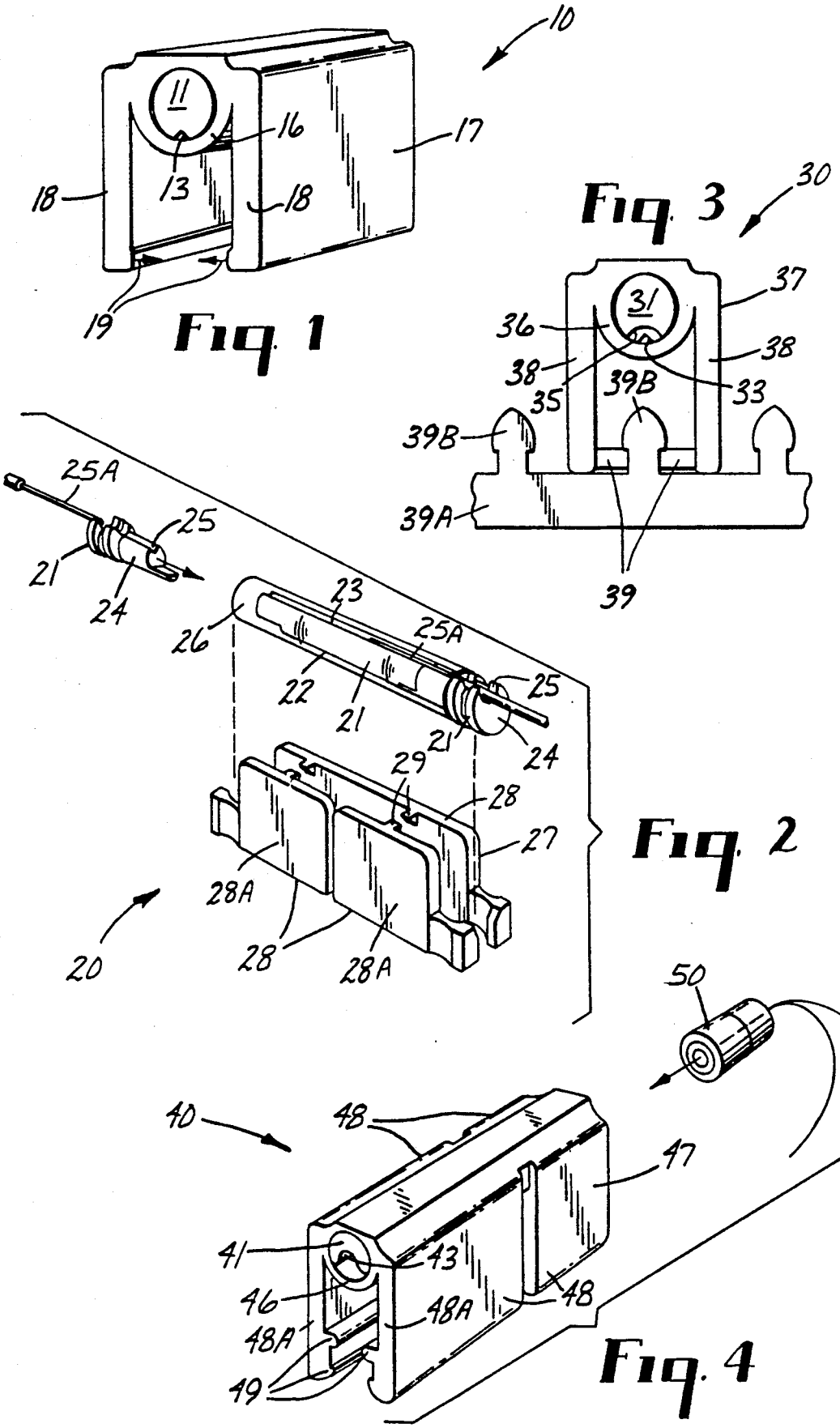

OPTICAL FIBER CONNECTOR INCLUDING INTEGRAL DEFORMABLE HOUSING AND SECOND-CLASS LEVERS

BACKGROUND OF THE INVENTION

1. Field of the Invention

The invention concerns optical fiber connectors that can coaxially interconnect two optical fibers or can connect an optical fiber to an opto-electronic element.

2. Description of the Related Art

Some prior optical fiber connectors require mechanical elements to be secured permanently to the optical fibers, followed by attaching each such element either to a complementary element or to a fixture. Doing so can require special tools.

A relatively inexpensive mechanical optical fiber connector can be constructed as disclosed in coassigned U.S. Pat. No. 4,470,180 (Blomgren). A preferred connector of the Blomgren '180 patent includes an elongated mount that is encompassed by a resiliently deformable housing which, in its relatively undeformed state, can urge an end of an optical fiber against a straight longitudinal groove in the surface of the mount. Upon squeezing to deform the housing, a free end of a second optical fiber can be inserted to become coaxially interconnected with the first as shown in FIG. 6C of the Blomgren '180 patent, or it can be removed.

In an improvement of the Blomgren '180 patent connector, the elongated mount is a mandrel of substantially uniformly elliptical cross section as disclosed in coassigned U.S. Pat. No. 4,729,619 (Blomgren). An optical fiber connector now on the market ("DORRAN" #07-00060 from 3M) is constructed as taught in both Blomgren patents and also, as in the Blomgren '619 patent, has a strain-relief chock formed with a trough against which the fiber buffer layer can be gripped after being exposed by stripping.

The DORRAN optical fiber connector employs a small, pliers-like tool to squeeze the housing. Such a tool is available as part of DORRAN #05-00105 field termination kit.

SUMMARY OF THE INVENTION

The invention provides an optical fiber connector which is similar to the DORRAN connector, but can be used without a tool. Like the DORRAN connector, that of the invention includes (a) an elongated mount, the surface of which is formed with a straight longitudinal groove, and (b) a deformable housing surrounding said mount, which housing when undeformed can urge an end of an optical fiber against the groove and when deformed can release the fiber. Like the elongated mount of the DORRAN connector, that of the invention preferably is a mandrel of substantially uniform elliptical cross section.

The novel optical fiber connector differs from that of the DORRAN connector in that integral with or around the housing is an envelope incorporating a pair of second-class levers which, when squeezed together by ones fingers, deform the housing to install or release an optical fiber. The levers also can provide means for releasably attaching the novel optical fiber connector to a patch panel or optical fiber distribution module.

Preferably the levers normally extend substantially parallel to each other and contact the housing approximately at the diameter of the mount. Upon squeezing the levers, the housing is distorted to an egg shape, thus lifting it off the longitudinal groove or a captured optical fiber. This makes it easier to insert and remove optical fibers as compared to using a tool.

Preferably the envelope and housing are a unitary piece of resilient thermoplastic resin. However, to enable the novel connector to incorporate a pre-existing DORRAN connector, the envelope can be designed to fit over its housing.

As in the DORRAN #07-00060 connector, optical fibers may be more quickly and easily assembled into the novel optical fiber connector when the mount and the strain-relief chock are integral with, or held against, each other such that the outermost surfaces of both the bare end of an optical fiber and the adjacent portion of its buffer lie in a substantially straight line. This permits the deformable housing to pinch the optical fiber and buffer simultaneously.

The mount and chock or chocks can be a single piece that preferably is a block of ceramic, because (1) ceramic can closely match the mechanical and thermal properties of glass, of which most optical fibers are made, and (2) a ceramic block can be produced with precision geometry and surfaces. Other materials that have similar characteristics include certain metal alloys and liquid crystal polymers such as "XYDAR" from Amoco Performance Products.

Because optical fibers of a single size are currently marketed with buffers of several different sizes, it may be desirable to form the mount and chock from separate pieces. Because the buffers do not need to be as precisely aligned as the optical fibers, the buffer-supporting chocks can be formed less expensively, e.g., from synthetic resin. The use of a synthetic resin makes it easy to color-code the novel connector. A preferred synthetic resin is polycarbonate which is a tough, dimensionally stable, and durable thermoplastic resin.

The mount can be designed to permit a bare end of each of an optical fiber to abut an opto-electronic element. When the novel connector interconnects two optical fibers, normally the groove in the mount permits the fibers to abut coaxially. When detuning is desired, the longitudinal groove can be formed to have a central discontinuity to position the abutting optical fibers slightly out of perfect coaxial alignment. When the connector is used with a semiconductor laser whose output gradually diminishes, the mount can be quickly and inexpensively changed from time to time to reduce the attenuation and keep the transmitted signal levels substantially constant. Detuning can instead be accomplished in the novel connector by interposing a filter or simply spacing the interconnected fibers.

BRIEF DESCRIPTION OF THE DRAWING

The invention may be more easily understood in reference to the drawing, each figure of which schematically illustrates an optical fiber connector of the invention that can interconnect two optical fibers, except that the connector of FIG. 4 connects an optical fiber to an opto-electronic element. In the drawing:

FIG. 1 is an isometric view of a first optical fiber connector of the invention;

FIG. 2 is an isometric view of a second optical fiber connector of the invention, partly cut away;

FIG. 3 is an end view of a third optical fiber connector of the invention which has been releasably mounted on a panel; and FIG. 4 is an isometric view of a fourth optical fiber connector of the invention.

DESCRIPTION OF THE PREFERRED EMBODIMENT

In FIG. 1, an optical fiber connector 10 has an elongated a mandrel 11 of uniformly elliptical cross section. Formed in the surface of the mandrel is a straight longitudinal V-groove 13 against which the bare ends of coaxially abutting optical fibers (not shown) can be urged by a resiliently deformable housing 16. Integral with the housing is an envelope 17 incorporating a pair of flanges 18 that normally extend substantially parallel to each other and intersect the housing approximately at the diameter of the mandrel. As used herein, the statement that one element is integral with another will be understood to mean that the two elements are formed as a single piece. When squeezed together by ones fingers in the direction of the arrows 19, the flanges act as second-class levers to deform the housing, thus releasing the bare ends of the optical fibers.

In FIG. 2, an optical fiber connector 20 has an elongated 3-piece mandrel 21 of uniformly elliptical cross section. The central piece 22 is ceramic and has a longitudinal V-groove 23 for receiving the bare ends of coaxially abutting optical fibers (not shown). Fitting against the ends of the central piece are a pair of resinous strain-relief chocks 24, each of which is formed with a cylindrical trough 25, the depth of which permits the outermost surfaces of the buffers and the bare ends 25A of a pair of fibers to lie in a substantially straight line. A resiliently deformable housing 26 can grip the optical fibers and buffers simultaneously.

The housing 26 can be seated in an envelope 27 that incorporates a pair of normally parallel flanges 28, one of which is divided centrally into a pair of levers 28A. When one of the levers is squeezed with the opposing flange, the housing is deformed to permit an optical fiber to be received or removed at that end of the connector. Protrusions 29 prevent overstressing of the housing 26.

In FIG. 3, an optical fiber connector 30 has an elongated mandrel 31 of uniformly elliptical cross section. Formed in the surface of the mandrel is a straight longitudinal groove having a central V-portion 33 to receive the bare ends of coaxially abutting optical fibers (not shown) and deeper outer troughs 35 to receive the buffers of the fibers. The bare ends and buffers can be urged against the mandrel 31 by a resiliently deformable housing 36. Integral with the housing is an envelope 37 incorporating a pair of flanges 38. Protrusions 39 at the ends of the flanges permit the connector 30 to be releasably attached to a panel 39A at any of a plurality of parallel lands 39B.

In FIG. 4, an optical fiber connector 40 has an elongated mandrel 41 of uniformly elliptical cross section. Formed in the surface of the mandrel is a bellmouth 43 to a straight longitudinal groove against which an optical fiber (not shown) can be pinched by a resiliently deformable housing 46. Integral with the housing is an envelope 47 incorporating a pair of flanges 48, each of which is divided centrally so that there are a pair of levers 48A at a first end of the connector 40. The envelope is formed to receive an opto-electronic element 50 at the other end of the connector in abutting relation to an optical fiber to be inserted into the first end. Protrusions 49 at the ends of the flanges 48 both prevent overstressing of the housing 46 and permit the connector 40 to be releasably attached to a panel (not shown).

EXAMPLE 1

A prototype of the optical fiber connector 10 of FIG. 1 has been made to have a ceramic mandrel 11 and an envelope 17 machined from a block of polyetherimide resin ("ULTEM" 1000 from GE). Its dimensions are:

| | |
|---|---|
| envelope | |
| length | 32 mm |
| height | 10 mm |
| width | 7 mm |
| flange thickness | 1.4 mm |
| bore diameter | 3.25 mm |
| mandrel | |
| major diameter | 3.28 mm |
| minor diameter | 2.9 mm |
| V-groove | |
| included angle | 70° |
| width at circumference | 0.2 mm |
| buffer trough radius | 0.44 mm |

The flanges were sufficiently resilient such that upon squeezing the flanges at one end with ones fingers, an optical fiber was easily inserted or removed without disturbing an optical fiber that had been secured at the other end.

EXAMPLES 2 AND 3

Prototypes similar to the optical fiber connector 10 of FIG. 1 have been made in the same manner except cutting one flange to form two levers (Example 2) in the manner illustrated in FIG. 2 and cutting both flanges to form two pairs of levers (Example 3). It was easier to squeeze a lever and flange of the connector of Example 2 as compared to Example 1, and easier to squeeze a pair of levers of the connector of Example 3 as compared to that of Example 1.

EXAMPLE 4

A prototype of the optical fiber connector 20 of FIG. 2 has been made to have a ceramic mandrel 21, a pair of resinous strain-relief chocks 24, a housing 26 of polyethersulfone, and an envelope 27 injection molded of polyetherimide resin.

Each of the optical fiber connectors of Examples 1–4 was adjudged to be easier to use than is the DORRAN #07-00060 connector.

What is claimed is:
1. An optical fiber connector comprising
   (a) an elongated mount, the surface of which is formed with a straight longitudinal groove and (b) a deformable housing surrounding said mount, which housing when undeformed can urge an end of an optical fiber against the groove and when deformed can release that fiber, wherein the improvement comprises:
   integral with or around the housing is an envelope incorporating a pair of second-class levers which, when squeezed together by ones fingers, deform the housing to release said optical fiber.
2. An optical fiber connector as defined in claim 1 wherein the levers normally extend substantially parallel to each other and contact the housing approximately at the diameter of the mount, so that upon squeezing the levers, the housing is distorted to an egg shape, thus lifting it off the longitudinal groove or a captured optical fiber.

3. An optical fiber connector as defined in claim 1 wherein said envelope incorporates means for restricting the movement of the levers toward each other.

4. An optical fiber connector as defined in claim 3 wherein said movement restricting means comprises a projection integral with each of said levers, which projections abut when the levers are squeezed together.

5. An optical fiber connector as defined in claim 1 wherein the envelope and housing are a unitary piece of resilient resin.

6. An optical fiber connector as defined in claim 1 wherein the housing and envelope are separate pieces, and the envelope fits over the housing.

7. An optical fiber connector as defined in claim 1 and further comprising means permitting a bare end of each of a pair of optical fibers to be inserted into the groove in abutting relation.

8. An optical fiber connector as defined in claim 1 wherein the mount abuts an opto-electronic element at said groove.

9. An optical fiber connector as defined in claim 1 wherein the mount has a substantially uniformly elliptical cross section, and said groove extends the full length of the mount at a major axis of said elliptical cross section.

10. An optical fiber connector as defined in claim 1 wherein said groove has uniformly shallow and uniformly deep portions in which a bare end of an optical fiber and an adjacent portion of its buffer can respectively nest with the outermost surfaces of each lying in a substantially straight line, thus permitting said deformable housing to urge the optical fiber and buffer against the mount simultaneously.

11. An optical fiber connector as defined in claim 10 wherein said shallow portion is central and and said deep portions are at the extremities of the groove so that the bare ends and buffers of a pair of optical fibers can be interconnected in abutting relation.

12. An optical fiber connector as defined in claim 1 wherein the mount is a mandrel of substantially uniform elliptical cross section.

13. An optical fiber connector as defined in claim 1 wherein each of said levers is formed with means for releasably attaching its extremity to a patch panel or an optical fiber distribution module.

* * * * *